(12) United States Patent
Hirose et al.

(10) Patent No.: US 7,390,023 B2
(45) Date of Patent: Jun. 24, 2008

(54) MOTORCYCLE FUEL TANK

(75) Inventors: Atsushi Hirose, Shizuoka (JP); Toru Kitsunai, Shizuoka (JP); Hiroshi Yamagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 246 days.

(21) Appl. No.: 11/274,012

(22) Filed: Nov. 15, 2005

(65) Prior Publication Data
US 2006/0108369 A1 May 25, 2006

(30) Foreign Application Priority Data
Nov. 19, 2004 (JP) ............................. 2004-335596

(51) Int. Cl.
*B62D 61/02* (2006.01)
*B65D 88/00* (2006.01)
*B60P 3/22* (2006.01)

(52) U.S. Cl. ...................... 280/835; 180/219; 220/567.2

(58) Field of Classification Search ................ 180/219; 220/567.2; 224/413; 280/833, 834, 835
See application file for complete search history.

(56) References Cited

U.S. PATENT DOCUMENTS

| 4,401,309 A | * | 8/1983 | Matsuzaki et al. | .......... 280/835 |
| 4,449,723 A | * | 5/1984 | Shiratsuchi | ................. 280/833 |
| 7,252,170 B2 | * | 8/2007 | Miyakozawa et al. | ....... 180/219 |

FOREIGN PATENT DOCUMENTS

| EP | 1790747 A1 * | 5/2007 |
| JP | 05-000273 U | 1/1993 |
| JP | 07-299518 A | 11/1995 |
| JP | 08-232789 A | 9/1996 |
| JP | 08-323487 A | 12/1996 |

* cited by examiner

*Primary Examiner*—Lesley D. Morris
*Assistant Examiner*—Marc A Scharich
(74) *Attorney, Agent, or Firm*—Keating & Bennett, LLP

(57) ABSTRACT

A motorcycle fuel tank according to a preferred embodiment of the present invention includes an upper shell, and a lower shell including a body and fixing portions. The lower shell body is bonded to the upper shell and arranged to define a fuel storage space with the upper shell. The fixing portions are used to fix the lower shell body onto a motorcycle body. The lower shell is made of an aluminum alloy and the lower shell body and the fixing portions are formed by a casting process such that the fixing portions are integral with the lower shell.

20 Claims, 7 Drawing Sheets

MOTORCYCLE FUEL TANK

BACKGROUND OF THE INVENTION

1. Field of the Invention

The present invention relates to a motorcycle fuel tank and more particularly relates to a motorcycle fuel tank made of aluminum or an aluminum alloy.

2. Description of the Related Art

To decrease the fuel consumption of a motorcycle or an automobile while improving its running performance, it is important to reduce the weight of its body as much as possible. The weight of a motorcycle or an automobile may be reduced by using a lighter weight material for its components. In the prior art, the majority of those components, including a frame, a chassis and so on, have been made of either iron or a steel containing iron. Recently, however, it was proposed that aluminum, having a smaller specific gravity than iron, be used as a material for those components. The density of aluminum is about one-third of that of iron. Thus, if aluminum or an aluminum alloy were used as a material for the components, then the weight of a motorcycle or an automobile could be reduced significantly.

Japanese Patent Application Laid-Open Publication No. 8-232789 discloses a fuel tank made of aluminum or an aluminum alloy for use in cars. This fuel tank includes an upper casing and a lower casing, which are made by a drawing process and which are brazed together, thereby defining a box-shaped closed space.

However, nobody has ever proposed a motorcycle fuel tank made of aluminum or an aluminum alloy. This is probably because a motorcycle fuel tank needs to meet a greater number of requirements than a car fuel tank and because it is not easy to obtain a fuel tank satisfying all of those requirements.

More specifically, as to motorcycles, the fuel tank forms an integral part of the vehicle's appearance, and therefore, needs to have a beautiful shape of good design. Also, in assembling the components on the body, the motorcycle fuel tank has to be arranged within a limited space. For that reason, a motorcycle fuel tank normally has a complex shape and it is difficult to make a tank of such a complex shape of an aluminum alloy, which is a metal that is hard to form in a desired shape and bond together. Furthermore, a motorcycle is easily subject to the vibrations of the wheels on the road, the vibrations of the engine, and the heat of the engine, and therefore, its fuel tank should be sufficiently durable so as to be protected from those vibrations and the heat. Furthermore, to fix a fuel tank of such a complex shape onto the frame of a motorcycle, it is necessary to provide a fixing portion for the fuel tank. However, the motorcycle fuel tank has such a complex shape that it is usually hard to provide a fixing portion for the motorcycle fuel tank with high positioning accuracy. Besides, this fixing portion also needs to be durable so as to be protected from the vibrations and heat from the motorcycle.

SUMMARY OF THE INVENTION

In order to overcome the problems described above, preferred embodiments of the present invention provide a fuel tank that is made of either aluminum or an aluminum alloy and satisfies the requirements imposed on motorcycles.

A motorcycle fuel tank according to a preferred embodiment of the present invention preferably includes an upper shell and a lower shell including a body and fixing portions. The lower shell body is preferably bonded to the upper shell and arranged to define a fuel storage space with the upper shell. The fixing portions are preferably used to fix the lower shell body onto a motorcycle body. The lower shell is preferably made of an aluminum alloy and the lower shell body and the fixing portions are preferably formed by a casting process such that the fixing portions are integral with the lower shell.

In one preferred embodiment of the present invention, the upper shell is preferably made of a press-formed aluminum or an aluminum alloy material and is preferably formed by a press forming process.

A motorcycle fuel tank according to another preferred embodiment of the present invention preferably includes an upper shell and a lower shell including a body and fixing portions. The lower shell body is preferably bonded to the upper shell and arranged to define a fuel storage space with the upper shell. The fixing portions are preferably used to fix the lower shell body onto a motorcycle body. The upper and lower shells are preferably made of aluminum or an aluminum alloy and may have mutually different compositions.

In this particular preferred embodiment, at least the lower shell is preferably made of an aluminum alloy containing silicon and the weight percentage of silicon added to the lower shell is preferably greater than that of silicon added to the upper shell.

In another preferred embodiment, the upper shell is preferably made of Al, an Al—Mg based alloy or an Al—Si—Mg based alloy and the lower shell is preferably made of an Al—Si based alloy, an Al—Si—Mg based alloy or an Al—Si—Cu based alloy.

In still another preferred embodiment, the upper and lower shells are preferably welded or brazed together.

In yet another preferred embodiment, the fixing portions preferably include a first set of fixing portions to be fixed on a first frame of the motorcycle body and a second set of fixing portions to be fixed on a second frame of the motorcycle body.

In this particular preferred embodiment, the lower shell body preferably includes a bottom and a side surface extending from the periphery of the bottom, and the first set of fixing portions are preferably arranged on the side surface.

In a specific preferred embodiment, the first set of fixing portions preferably include two fixing portions and a rib portion arranged on the side surface to connect between the two fixing portions.

More particularly, the lower shell preferably includes a fuel supply port that has an opening, which is cut through the bottom of the lower shell body, and a flange which is arranged around the opening. The fuel supply port and the lower shell body are preferably formed integrally by a casting process.

In yet another preferred embodiment, the lower shell preferably includes two fixing portions of the second set which are respectively arranged on two opposing sides on the outer periphery of the bottom of the lower shell body.

In yet another preferred embodiment, the upper shell preferably includes a plurality of upper sub-portions which are formed by a press forming process and welded or brazed together.

A motorcycle according to a preferred embodiment of the present invention preferably includes a frame, an engine supported on the frame, and the fuel tank according to any of the preferred embodiments of the present invention described above. The tank is preferably fixed on the frame.

A method of making a motorcycle fuel tank according to a preferred embodiment of the present invention preferably includes the steps of (A) making an upper shell, and (B) forming a lower shell, including a body and fixing portions, integrally by casting an aluminum alloy. The lower shell body is preferably arranged to define a fuel storage space with the upper shell and the fixing portions are preferably used to fix the lower shell body onto a motorcycle body. The method preferably further includes the step of (C) welding or brazing the upper shell and the lower shell body together.

In one preferred embodiment of the present invention, the step (A) preferably includes subjecting an aluminum plate or an aluminum alloy plate to a press forming process.

In this particular preferred embodiment, the steps (A) and (B) preferably include making at least the lower shell of an aluminum alloy containing silicon such that the weight percentage of silicon added to the lower shell is greater than the weight percentage of silicon added to the upper shell.

In a specific preferred embodiment, the step (A) preferably includes making the upper shell of Al, an Al—Mg based alloy or an Al—Si—Mg based alloy and the step (B) preferably includes making the lower shell of an Al—Si based alloy, an Al—Si—Mg based alloy or an Al—Si—Cu based alloy.

In yet another preferred embodiment, the step (B) preferably includes making a lower shell that has a first set of fixing portions to be fixed on a first frame of the motorcycle body and a second set of fixing portions to be fixed on a second frame of the motorcycle body.

In that case, the step (B) preferably includes making a lower shell, of which the body includes a bottom and a side surface extending from the periphery of the bottom, and the first set of fixing portions are preferably arranged on the side surface.

In yet another preferred embodiment, the step (B) preferably includes forming a fuel supply port and the lower shell body integrally with each other by a casting process. The fuel supply port preferably has an opening, which is cut through the bottom of the lower shell body, and a flange which is arranged around the opening.

In yet another preferred embodiment, the step (A) preferably includes making a plurality of upper sub-portions by subjecting a plate of aluminum or a plate of an aluminum alloy to a press forming process and welding or brazing the upper sub-portions together to make the upper shell.

According to a preferred embodiment of the present invention, a motorcycle fuel tank is made up of an upper shell and a lower shell which is provided with fixing portions to fix the fuel tank onto a frame. Thus, it is possible to make the upper and lower shells of alloys with mutually different compositions which are carefully selected to fulfill their specific functions, using the best possible forming methods, and allow the shells to be bonded together. As a result, the fuel tank can satisfy the many requirements required for a motorcycle fuel tank. Among other things, if the body and fixing portions of the lower shell are formed integrally by casting an aluminum alloy, then a lightweight motorcycle fuel tank, including fixing portions with increased mechanical strength, can be obtained. In addition, by using this motorcycle fuel tank a motorcycle with high running performance is obtained.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of a motorcycle fuel tank according to the present invention and a motorcycle including such a fuel tank will be described with reference to the accompanying drawings. In this specification, a motorcycle means any two-wheel, or three or four wheel, straddle-type vehicle which has an internal combustion engine or an electric motor. An All-Terrain Vehicle is one of the motorcycles referred to in this specification. There is no specific limitation on the engine displacement. In the case where a motorcycle has an electric motor, the fuel tank stores a fuel which is used to generate an electric power for driving the electric motor.

Figure 1:
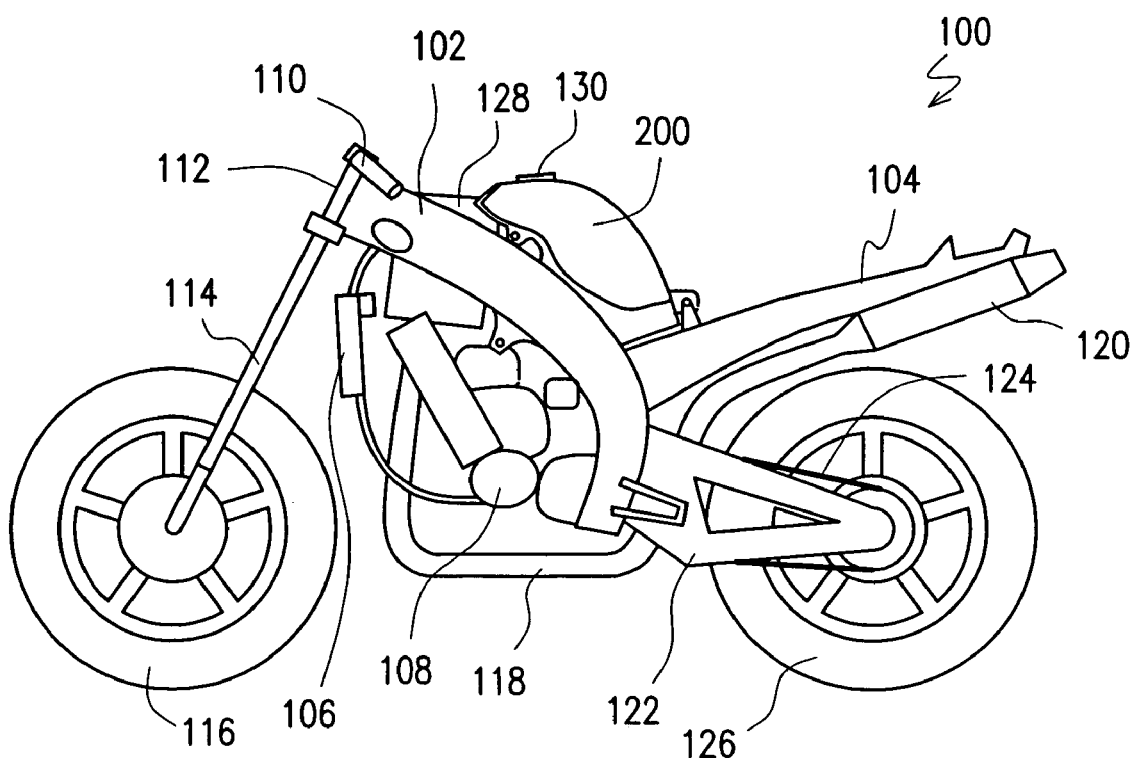
FIG. 1 is a schematic side view illustrating a motorcycle including a motorcycle fuel tank according to a preferred embodiment of the present invention.

FIG. 1 is a schematic side view illustrating a motorcycle 100 including a motorcycle fuel tank according to a preferred embodiment of the present invention (which will be simply referred to herein as a "fuel tank"). As shown in FIG. 1, the motorcycle 100 preferably includes a fuel tank 200, a main frame 102, a rear frame 104, an engine 108, a front wheel 116 and a rear wheel 126. The motorcycle 100 is a riding type of vehicle on which a rider is supposed to ride.

The main frame 102 preferably includes a pair of frames extending backward from a head pipe 112, which is located at a front position of the vehicle. Each of those frames preferably has a curved portion that extends downward near the center of the motorcycle 100. One end of the rear frame 104 is connected to the curved portions of the main frame 102. The main frame 102 and the rear frame 104 make up the body of the motorcycle 100. The main frame 102 and the rear frame 104 are preferably made of an aluminum alloy.

A front fork 114 is preferably secured rotatably to the head pipe 112. The front wheel 116 is rotatably supported at one end of the front fork 114 and handlebars 110 are preferably secured to the other end of the front fork 114.

The fuel tank 200 is preferably arranged on the main frame 102 and the rear frame 104 near the center of the motorcycle 100. An air cleaner 128 is preferably provided in front of the fuel tank 200. A cap 130 is preferably provided for the fuel tank 200 so as to close a fuel intake port (not shown).

The engine 108 is preferably supported on the main frame 102 so as to be located under the fuel tank 200. A radiator 106 is preferably provided in front of the engine 108. An exhaust pipe 118 is connected to the exhaust port of the engine 108. The exhaust pipe 118 preferably extends backward under the engine 108 and along the rear frame 104 and is connected to a muffler 120 that is fixed on the rear frame 104.

A rear arm 122 is preferably connected to the main frame 102 so as to support the rear wheel 126 thereon in a rotatable position. The rotational driving force of the engine 108 is preferably transmitted to the rear wheel 126 by way of a chain 124.

The motorcycle 100 preferably further includes a main seat provided on the rear frame 104 behind the fuel tank 200 and a decorative covering that partially covers the air cleaner 128 and the fuel tank 200. However, these additional components are not illustrated in FIG. 1 to show the structure of the fuel tank 200 more clearly.

Figure 2:
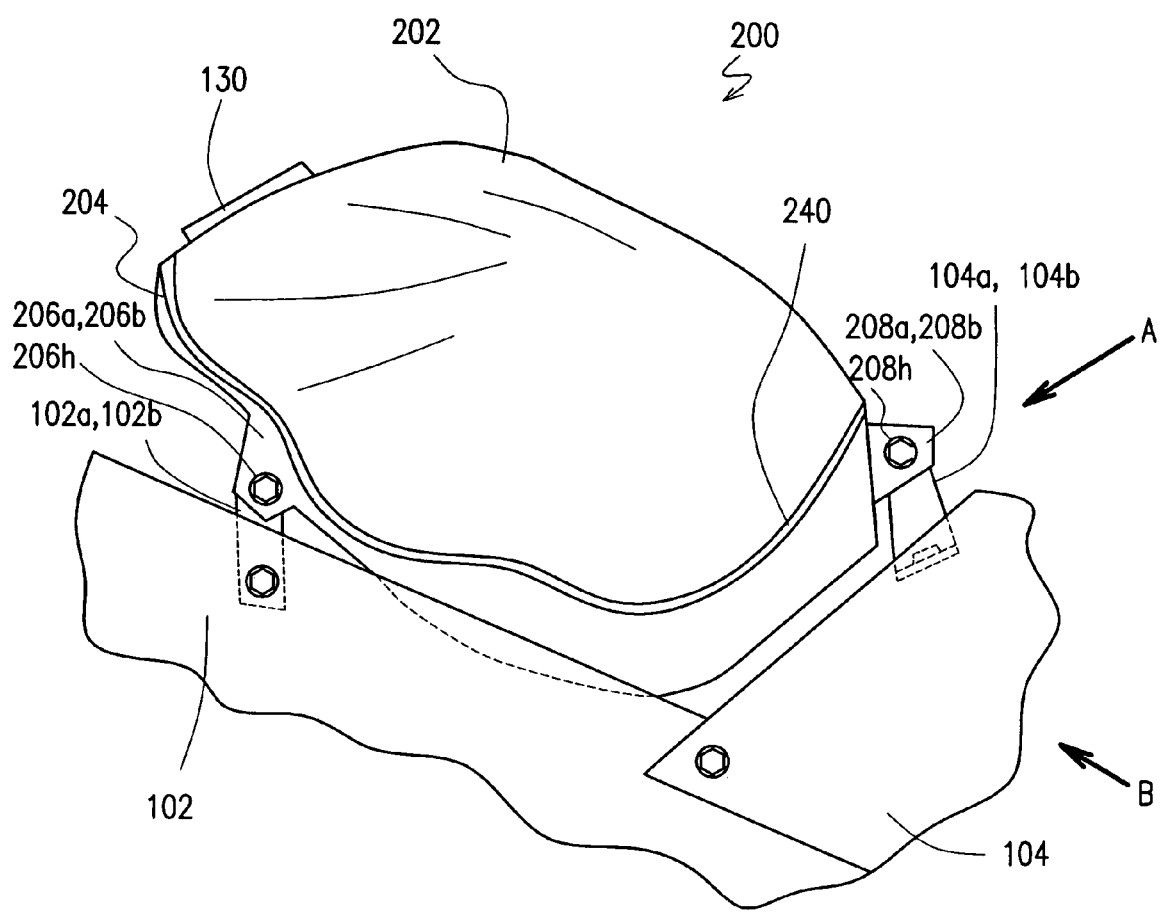
FIG. 2 is a side view illustrating the fuel tank shown in FIG. 1 and its surrounding portions on a larger scale.

FIG. 2 is a side view illustrating the fuel tank 200 shown in FIG. 1 and its surrounding portions on a larger scale. The fuel tank 200 preferably includes an upper shell 202 and a lower shell 204 as its upper and lower halves, respectively. The upper shell 202 and lower shell 204 are also sometimes called an "outer panel" and an "inner panel", respectively. The upper and lower shells 202 and 204 are preferably bonded together along a bonding portion 240 so as to define a fuel storage space. The volume of this space is determined arbitrarily according to the displacement of the engine 108 provided in the motorcycle 100 and the application of the motorcycle 100. The fuel tank 200 may have a volume of about 20 liters, for example. Although not shown in FIG. 2, the bonding portion 240 is preferably hidden behind a decorative panel or the main seat so as not to affect the appearance of the motorcycle 100.

The lower shell 204 preferably includes a first set of fixing portions 208a and 208b and a second set of fixing portions 206a and 206b which are arranged to fix the fuel tank 200 onto the rear frame 104 and the main frame 102. In FIG. 2, the first set of fixing portions 208a and 208b are shown overlapping each other and the second set of fixing portions 206a and 206b are also shown overlapping each other. Each of these fixing portions is preferably provided with a fitting portion for fixing the fuel tank 200 onto the rear frame 104 and main frame 102. In this preferred embodiment, through holes 208h and 206h to pass bolts are preferably cut through the first and second sets of fixing portions 208a, 208b and 206a, 206b, respectively.

The first set of fixing portions 208a, 208b are preferably connected with nuts and bolts to a first pair of brackets 104a, 104b provided on the rear frame 104. On the other hand, the second set of fixing portions 206a, 206b are preferably connected with nuts and bolts to a second pair of brackets 102a, 102b provided on the main frame 102. In this manner, the fuel tank 200 is fixed onto the main frame 102 and rear frame 104. It should be noted that the fitting portions of the fixing portions do not have to be through holes to pass the bolts. Alternatively, the fitting portions may also be pins, hooks or any other type of member that can be used to fix the fuel tank 200 onto the motorcycle body. Also, the fitting portions of the fixing portions may engage with the rear frame 104 or the main frame 102 directly or with any other member fixed on the motorcycle body.

Figure 3:
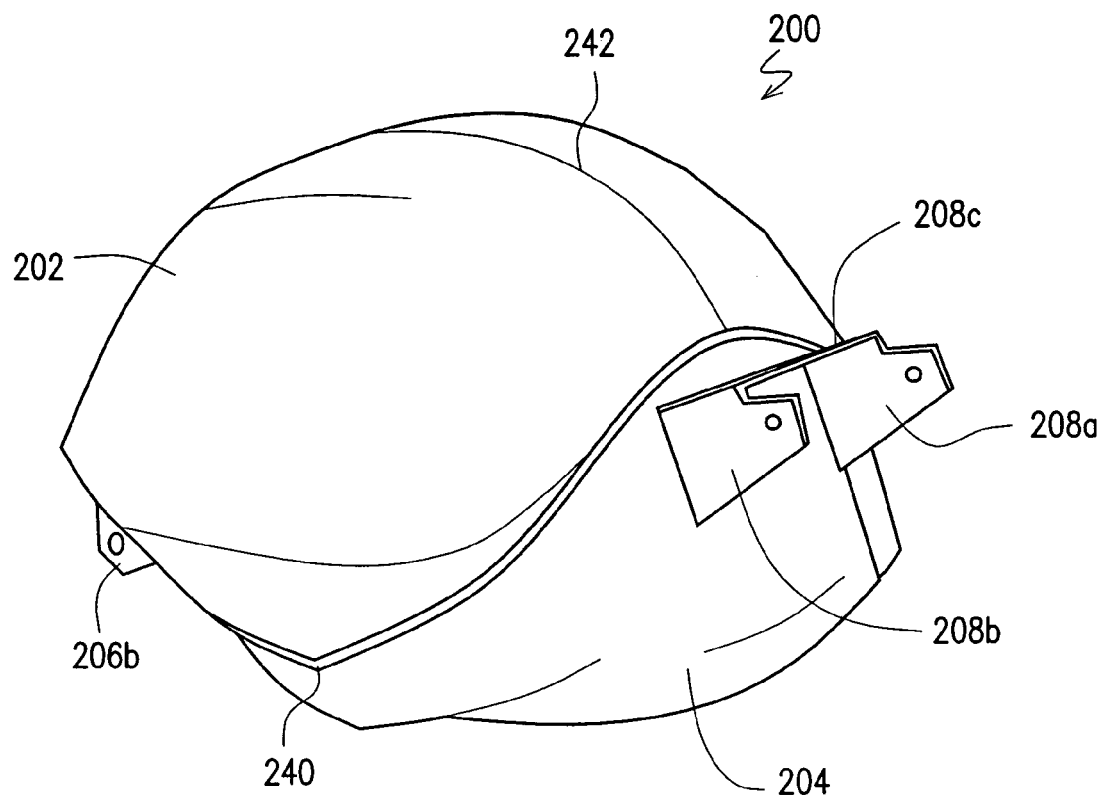
FIG. 3 is a perspective view of the fuel tank as viewed from an angle.
Figure 4:
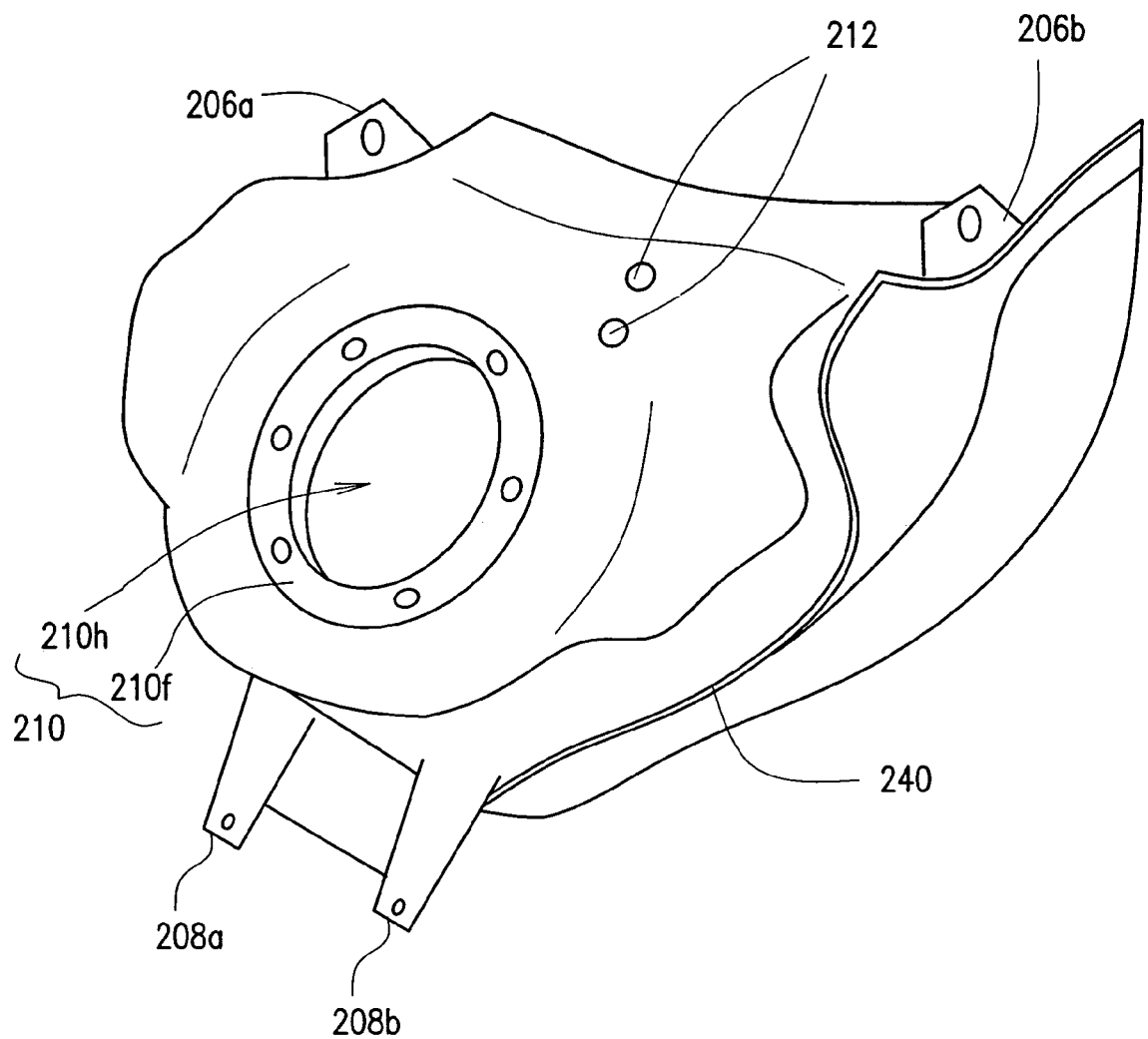
FIG. 4 is a perspective view of the fuel tank as viewed from a different angle.
Figure 5:
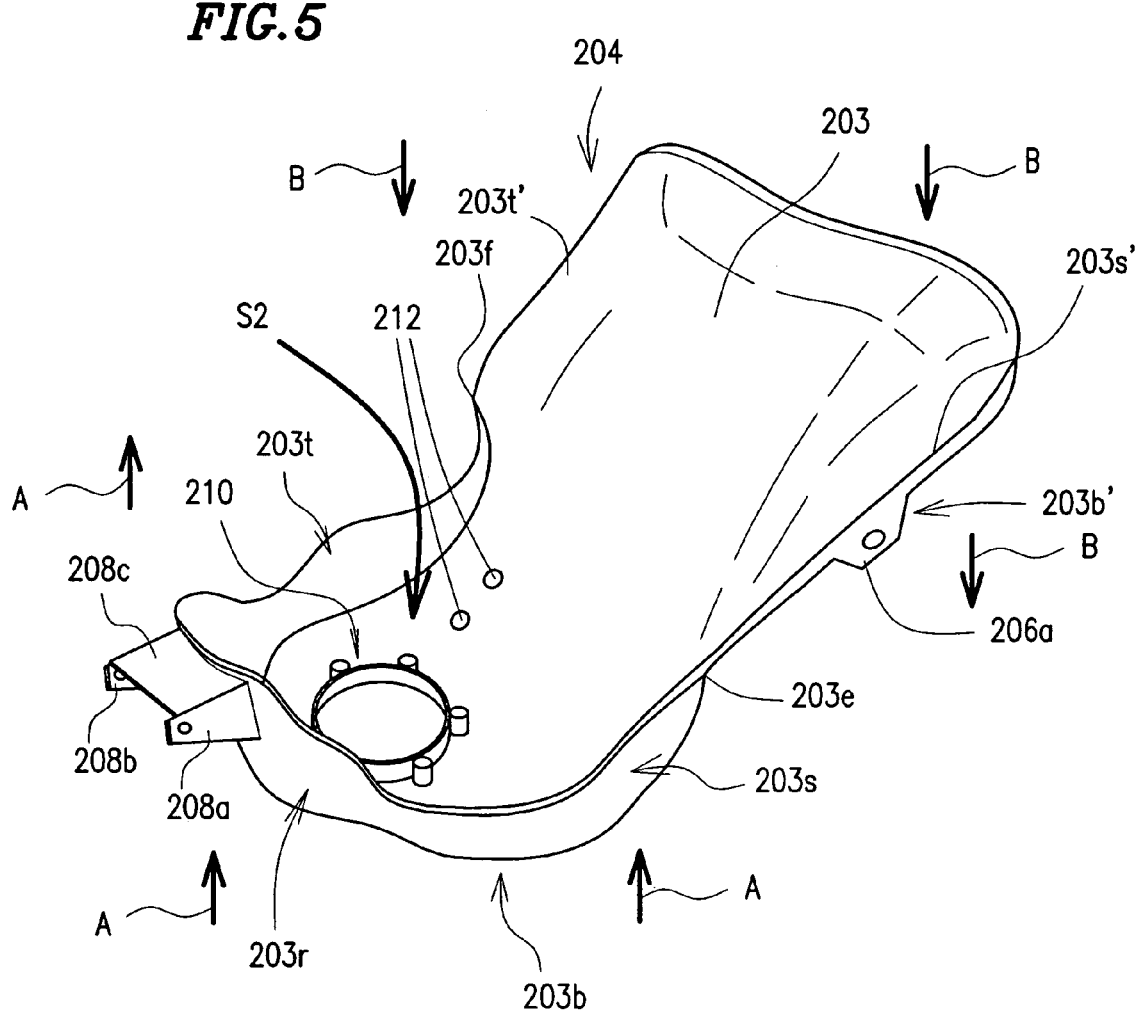
FIG. 5 is a perspective view illustrating the lower shell of the fuel tank.
Figure 6:
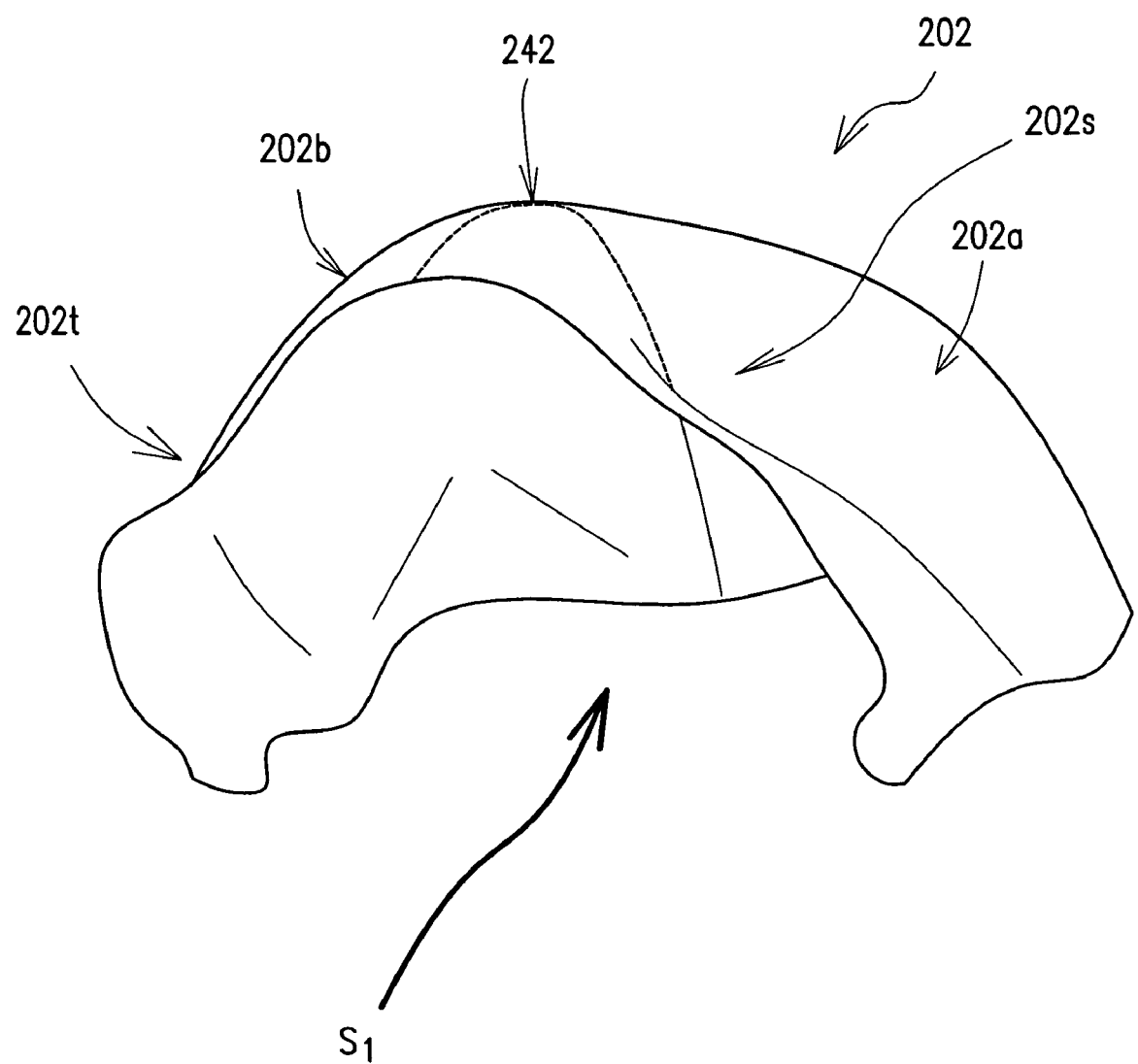
FIG. 6 is a perspective view illustrating the upper shell of the fuel tank.

Hereinafter, the structure of the fuel tank 200 will be described in detail. FIG. 3 is a perspective view illustrating the fuel tank 200 as viewed from above the first set of fixing portions 208a and 208b (i.e., from the direction indicated by the arrow A in FIG. 2). FIG. 4 is a perspective view illustrating the bottom of the fuel tank 200 (i.e., as viewed from the direction indicated by the arrow B in FIG. 2). FIGS. 5 and 6 are perspective views illustrating the lower shell 204 and upper shell 202, respectively. In FIGS. 3 through 6, neither the fuel intake port nor the cap that covers the intake port is shown.

In the fuel tank 200, the upper shell 202 mostly includes parts that are clearly visible on the outside of the fuel tank 200, while the lower shell 204 mostly includes parts that are arranged to fix the fuel tank 200 onto the main frame 102 and rear frame 104 and to maintain the mechanical strength of the fuel tank structure. Thus, the upper and lower shells 202 and 204 may be made of metals with mutually different compositions which are carefully selected to fulfill their specific functions and be shaped by their best possible forming methods.

As shown in FIGS. 3 and 6, the upper shell 202 preferably has a partially notched dome shape, which is roughly obtained by dividing a spheroid into two along its major axis. The space Si defined inside of the upper shell 202 preferably forms a majority of the inner space defined by the fuel tank 200. To reduce the weight of the fuel tank 200, the upper shell 202 is preferably made of either aluminum or an aluminum alloy. Also, the upper shell 202 is distinctly visible on the outside of the motorcycle as a part of its design and therefore is preferably painted. For that reason, the outer surface of the upper shell 202 is preferably smooth. As long as these requirements are satisfied, the upper shell 202 may be made by any method. However, the upper shell 202 is preferably formed by subjecting a plate material to a press forming process because a smooth outer surface can be obtained easily by such a method. Nevertheless, in making the upper shell 202 by a press forming process, it might be difficult to make the upper shell 202 out of a single aluminum or aluminum alloy plate depending on the intended shape of the upper shell 202. In that case, a plurality of aluminum or aluminum alloy plates may be formed into their respective predetermined shapes by a press forming process and then welded or brazed together to make the upper shell 202. In this preferred embodiment, the upper sub-portions 202a and 202b, which are obtained by dividing the upper shell 202 in two on the plane of symmetry as shown in FIGS. 3 and 6, are preferably formed by subjecting aluminum or aluminum alloy plates to a press forming process. Thereafter, the upper sub-portions 202a and 202b are preferably welded together at the bonding portion 242, thereby forming the upper shell 202. The aluminum or aluminum alloy plates may be welded together by an electric arc-welding process such as an MIG or TIG process, a laser welding process, an electron beam welding process, or any other suitable process. If the upper sub-portions 202a and 202b are brazed together, then an Al—Si based alloy may be used as a brazing alloy. To achieve an even higher bond strength, the upper sub-portions 202a and 202b are preferably welded together.

If the upper shell 202 is formed by bonding together the upper sub-portions 202a and 202b that are made of two aluminum or aluminum alloy plates by a press forming process, then the upper shell 202 may have an even more complex shape and the profile of the upper shell 202 may be designed even more freely. In addition, compared to a situation where the upper sub-portions 202a and 202b are made of a single plate, the magnitude of deformation during the press forming process can be reduced and the production yield can be increased. For example, an upper shell 202, of which the dome has recessed portions 202s and 202t as shown in FIGS. 3 and 6, can be formed easily. In this shape, the rider of the motorcycle 100 can sandwich the fuel tank 200 between his or her legs more firmly by putting his or her thighs onto the recessed portions 202s and 202t. As a result, the rider can maintain a better posture while riding the motorcycle 100. The upper shell 202 may be composed of three or more sub-portions in view of these advantages.

As described above, the upper shell 202 is preferably made of aluminum or an aluminum alloy to reduce the weight of the fuel tank 200. When formed by a press forming process, the upper shell 202 is preferably made of Al (i.e., pure aluminum), an Al—Mg based alloy or an Al—Si—Mg based alloy considering the mechanical strength and processibility. Among other things, the larger the content of Si, the more easily the aluminum alloy cracks during the press forming process. Thus, an aluminum alloy with a small Si content is preferably used. More specifically, an Al—Mg based alloy including about 4 wt % to about 5 wt % of Mg or an Al—Si—Mg based alloy including at most about 1.2 wt % of Si and about 0.3 wt % to about 1.2 wt % of Mg is preferably used in one example of preferred embodiments of the present invention.

Also, to further reduce the weight of the fuel tank 200, the upper shell 202 preferably has as small a thickness as possible. And the optimum thickness of the upper shell 202 is determined by taking the processibility and the mechanical strength required for the fuel tank into consideration. Specifically, the upper shell 202 preferably has a thickness of about 0.8 mm to about 2.4 mm. The reasons are as follows. If the upper shell 202 were thinner than about 0.8 mm, then the upper shell 202 would not have sufficient mechanical strength. However, if the upper shell 202 were thicker than about 2.4 mm, then the weight of the aluminum fuel tank would not be significantly lighter than that of a conventional iron fuel tank.

Next, the lower shell 204 will be described. As shown in FIGS. 4 and 5, the lower shell 204 preferably includes a lower shell body 203, the first set of fixing portions 208a, 208b and the second set of fixing portions 206a, 206b.

The lower shell 204 is bonded to the upper shell 202 preferably by welding or brazing, and defines a fuel storage space in cooperation with the upper shell 202. More specifically, as shown in FIG. 5, the lower shell body 203 preferably includes a bottom 203b and a rear side surface 203r, a right side surface 203s and a left side surface 203t that extend upward from around the bottom 203b as indicated by an arrow A and are continuous with each other so as to form a curve. Also, the bottom 203b is preferably raised gently at the front portion 203b' so as to face the rear side surface 203r. The outer periphery of the front portion 203b' extends slightly downward (i.e., in the opposite direction to the rear, right and left side surfaces 203r, 203s and 203t) as indicated by an arrow B, thereby defining a right side surface 203s' and a left side surface 203t'. The right side surfaces 203s and 203s' change their rising directions at a position 203et. In the same way, the left side surfaces 203t and 203t' change their rising directions at a position 203f. A space S2 is defined by the rear, right and left side surfaces 203r, 203s and 203t and a portion of the bottom 203b surrounded by these side surfaces.

As will be described in detail later, these portions of the lower shell 204 are preferably formed integrally by a casting process. Thus, even though the lower shell 204 has a complex structure in which the rear, right and left side surfaces 203r, 203s and 203t are raised to define the deep space S2, the lower shell 204 can still be formed relatively easily compared to the situation where the lower shell 204 is formed by a press forming process. Accordingly, the volume of the space S2 can be adjusted arbitrarily by changing the heights of the rear, right and left side surfaces 203r, 203s and 203t. For example, the dimensions of the space S2 can be set by adjusting the shapes of the rear, right and left side surfaces 203r, 203s and 203t according to the structure of the main frame 102 and rear frame 104 and the arrangement of the engine 108 in the motorcycle 100. As a result, the fuel tank 200 can effectively use the space S2.

In addition, the bottom 203b and the rear, right and left side surfaces 203r, 203s and 203t that surround the space S2 will be located on the bottom and support the fuel in the fuel tank 200 when the fuel tank 200 is attached to the motorcycle 100. For that reason, if those portions surrounding the space S2 are formed integrally by a casting process, the portion of the fuel tank 200 that receives significant force will have increased mechanical strength.

As shown in FIG. 4, a pair of holes 212 and a fuel supply port 210 are preferably cut through the bottom 203b in the area surrounded by the rear, right and left side surfaces 203r, 203s and 203t of the bottom 203b. The fuel supply port 210 is preferably connected to the fuel intake port of the upper shell 202 by way of a pipe (not shown). Meanwhile, the holes 212 are preferably used as a drain for exhausting water, which would otherwise be reserved under the fuel injection port of the fuel tank 200, without affecting the appearance and an air hole for introducing air into the fuel tank 200 through a check valve of the fuel injection port, respectively. The fuel supply port 210 preferably has an opening 210h and a flange 210f surrounding the opening 210h. A fuel pump unit (not shown) is preferably inserted into the fuel tank 200 through the opening 210h and may be fixed onto the fuel tank 200 by screwing the flange 210f to a bracket, for example.

By forming the fuel supply port 210 as an integral part of the lower shell 204, there is preferably no gap between the fuel supply port and the fuel tank. Also, since the bottom 203b is located close to the engine, the bottom 203b may have a high temperature due to the heat transmitted from the engine. For that reason, if a separate fuel supply port were attached to the fuel tank, then the flange of the fuel supply port might be deformed under the heat or the degree of sealing might decrease due to a difference in thermal expansion coefficient. In contrast, these potential situations can be avoided by forming the fuel supply port 210 as an integral part of the lower shell 204.

The first set of fixing portions 208a and 208b are preferably formed seamlessly and integrally with the rear side surface 203r. The first set of fixing portions 208a and 208b are preferably connected together with a rib 208c that is provided seamlessly and integrally for the rear side surface 203r. Meanwhile, the second set of fixing portions 206a and 206b are preferably provided seamlessly and integrally on two opposing sides on the outer periphery of the bottom 203b so as to extend from the right and left side surfaces 203s' and 203t', respectively. To form all of these fixing portions seamlessly and integrally, the overall lower shell 204 is preferably made by a casting process.

Figure 7:
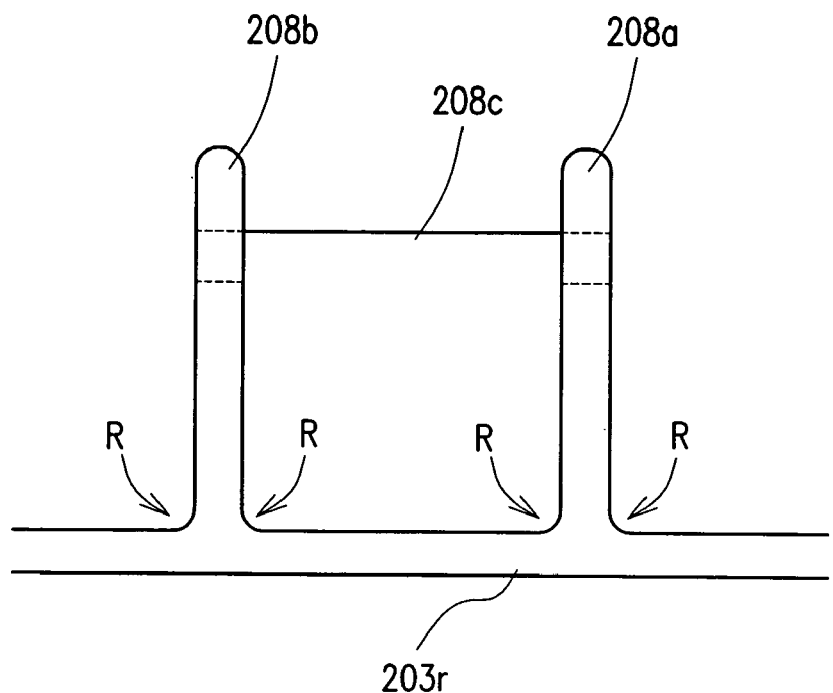
FIG. 7 is a cross-sectional view illustrating the first set of fixing portions and surrounding portions thereof.

FIG. 7 illustrates a cross section of the first set of fixing portions 208a and 208b. As shown in FIG. 7, the first set of fixing portions 208a and 208b and the rear side surface 203r are preferably formed seamlessly and integrally. The respective surfaces of the first set of fixing portions 208a and 208b and the rear side surface 203r are continuous with each other so as to define a gentle curve. And as pointed by the arrows R, the base of the first set of fixing portions 208a and 208b has a concave curved cross section. By using the rib 208c and this concave curved cross section, the first set of fixing portions 208a and 208b can be strongly connected to the rear side surface 203r of the lower shell 204. Also, as shown in FIG. 5, the rear side surface 203r is arranged so as to rise from the bottom 203b along with the right and left side surfaces 203s and 203t. Therefore, the rear side surface 203r itself is firmly connected to the lower shell body 203 of the lower shell 204. Consequently, the first set of fixing portions 208a and 208b are connected to the lower shell body 203 of the lower shell 204 with high mechanical strength.

Figure 8:
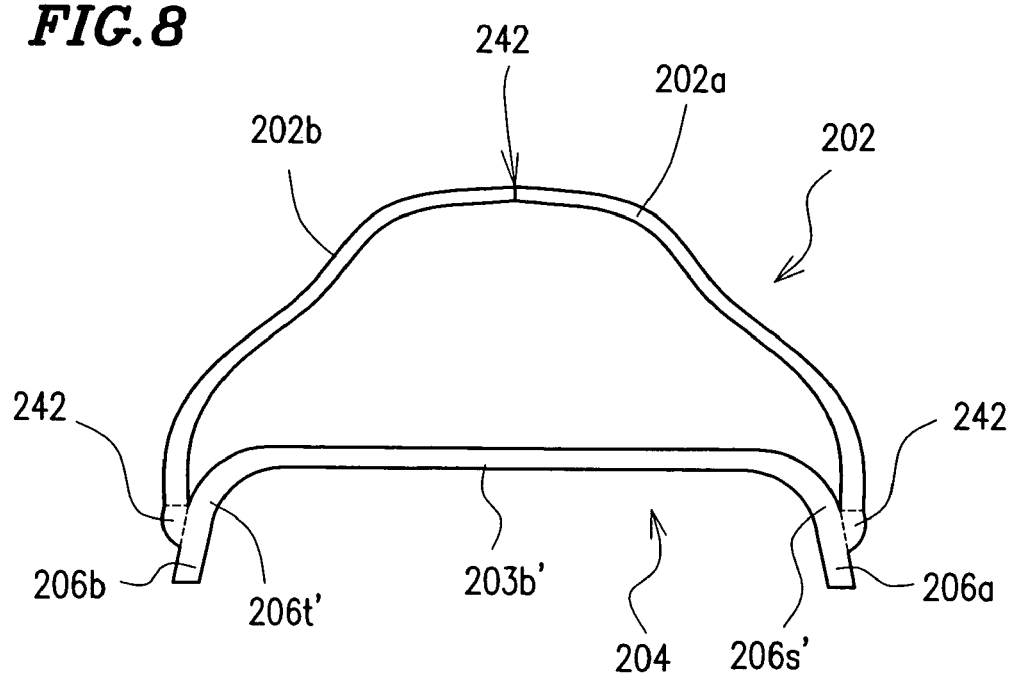
FIG. 8 is a cross-sectional view illustrating the second set of fixing portions and surrounding portions thereof.

FIG. 8 illustrates a cross section of a portion of the fuel tank 200 where the second set of fixing portions 206a and 206b are provided. As shown in FIG. 8, the second set of fixing portions 206a and 206b preferably form integral parts of the bottom 203b so as to extend from the side surfaces 206s' and 206t', respectively. Thus, the second set of fixing portions 206a and 206b are also connected to the lower shell body 203 with high mechanical strength.

The portions of the lower shell 204 are preferably formed integrally by a casting process. Among other things, a die casting process is preferably used because the lower shell 204 can be formed highly accurately by this process. Also, the lower shell 204 is preferably made of an aluminum alloy to reduce the weight thereof and is more preferably made of an aluminum alloy with a composition that makes the viscosity of its molten alloy low enough to achieve a smooth melt flow during the casting process. Besides, the lower shell 204 also needs to have sufficiently high mechanical strength. Examples of preferred aluminum alloys with these properties include Al—Si based alloys, Al—Si—Mg based alloys, and Al—Si—Cu based alloys. Among other things, an Al—Si—Mg based alloy including about 0.3 wt % of Mg and about 10 wt % of Si is particularly preferred. In that case, since a lot of Si is used, the melted alloy should flow smoothly during the casting process. In addition, since the lower shell 204 has a higher Si content than the upper shell 202, the lower shell 204 is harder than the upper shell 202.

Also, to further reduce the weight of the fuel tank 200, the lower shell 204 preferably has as small a thickness as possible. And the optimum thickness of the lower shell 204 is determined by taking the processibility and the mechanical strength required for the fuel tank into consideration. Specifically, the lower shell 204 preferably has a thickness of about 1.0 mm to about 2.4 mm. The reasons are as follows. If the lower shell 204 were thinner than about 1.0 mm, then it would be difficult to form the lower shell 204 by a die casting process. However, if the lower shell 204 were thicker than about 2.4 mm, then the weight of the aluminum fuel tank would not be significantly lighter than that of a conventional iron fuel tank. In addition, the lower shell 204 includes the fixing portions and receives greater forces than the upper shell 202. Thus, the lower shell 204 is preferably thicker than the upper shell 202.

The fuel tank 200 is preferably obtained by bonding together the upper and lower shells 202 and 204 having the above-described features. More specifically, as shown in FIG. 8, the upper and lower shells 202 and 204 are preferably fitted with each other such that the respective side surfaces of the lower shell 204 are externally covered with the upper shell 202 and then the upper and lower shells 202 and 204 are preferably welded or brazed together from outside of the upper shell 202. The upper and lower shells 202 and 204 may be welded together by an electric arc-welding process such as an MIG or TIG process, a laser welding process, an electron beam welding process, or any other suitable process. If the upper and lower shells 202 and 204 are brazed together, then an Al—Si based alloy is preferably used as a brazing alloy. To achieve an even higher bond strength, the upper and lower shells 202 and 204 are preferably welded together. As described above, the harder lower shell 204 is located inside of the upper shell 202, and therefore, the upper and lower shells 202 and 204 can be held firmly during the bonding process. That is to say, the bonding process can be carried out easily. In addition, since the respective side surfaces of the lower shell 204 are covered with the upper shell 202, their bonding portions make a plane contact with each other. As a result, the upper and lower shells 202 and 204 can be held firmly during the bonding process and the resulting bond strength can be increased due to the broader welding area.

As shown in FIGS. 1 and 2, the fuel tank 200 bonded in this manner is preferably fixed onto the main frame 102 and rear frame 104 by securing the first set of fixing portions 208a and 208b to the brackets 104a and 104b of the rear frame 104 and the second set of fixing portions 206a and 206b to the brackets 102a and 102b of the main frame 102, respectively.

As described above, the fuel tank 200 may be fabricated by forming the upper and lower shells 202 and 204 separately and then welding or brazing these shells together. The upper and lower shells 202 and 204 do not have to be formed in this order. That is to say, the lower shell 204 may be formed earlier than the upper shell 202. Or these shells may be formed at the same time.

According to a preferred embodiment of the present invention, the fuel tank 200 is made up of the upper shell 202 mostly including parts that are clearly visible on the outside of the fuel tank 200, and the lower shell 204 mostly including parts that are arranged to fix the fuel tank 200 onto the main frame 102 and rear frame 104 and to maintain the mechanical strength of the fuel tank structure. Thus, if the upper and lower shells 202 and 204 are made of metals with mutually different compositions, which are carefully selected to fulfill their specific functions and be shaped by the best possible forming methods and subsequently bonded together, then a lot of requirements imposed on motorcycle fuel tanks can be satisfied by the fuel tank 200 as a whole.

The upper shell 202 needs to have a beautiful shape and a smooth surface that should improve the appearance of the motorcycle 100. For that purpose, the upper shell 202 is preferably formed by subjecting an expandable aluminum alloy with good surface smoothness to a press forming process. In that case, the upper shell 202 can also have a good appearance even if its surface is painted. Also, if the upper shell 202 needs to have a complex shape, then a plurality of expandable materials may be formed into their respective predetermined shapes and then the resulting pieces may be welded or brazed together. Since the upper shell 202 does not have to exhibit as high a mechanical strength as the lower shell 204, the decrease in strength due to the bonding of these multiple pieces should have no significant consequence.

Meanwhile, the lower shell 204 needs to have high mechanical strength. For that reason, the lower shell, including the fixing portions, is preferably made of a cast material. More specifically, the first and second sets of fixing portions 208a, 208b and 206a, 206b of the lower shell 204 are preferably formed integrally with the lower shell body 203 by a casting process. As a result, the first and second sets of fixing portions 208a, 208b and 206a, 206b can be arranged on the lower shell body 203 with high positional accuracy and can be connected to the lower shell body 203 with high mechanical strength. In a motorcycle, the frames are easily subject to vibrations of the wheels on the road and vibrations of the engine. In addition, as the motorcycle is accelerated or decelerated, the fuel stored in the fuel tank is constantly moving and exerting forces on the fuel tank opposite to the direction in which the motorcycle is accelerated or decelerated. Furthermore, these forces are produced repeatedly. However, since the first and second sets of fixing portions 208a, 208b and 206a, 206b are connected to the lower shell body 203 strongly enough to withstand those vibrations and repeated loads, no metal fatigue will be produced due to the vibrations and repeated loads and high reliability will be guaranteed.

Additionally, by forming the respective portions of the lower shell integrally with each other, the manufacturing process time can be shortened significantly compared to a situation where the first and second sets of fixing portions 208a, 208b and 206a, 206b are attached afterward to the lower shell body 203 by a welding process, for example.

These advantages would be hard to achieve if the first and second sets of fixing portions 208a, 208b and 206a, 206b were attached to the lower shell body by a welding process. The reasons are as follows. Specifically, in welding the fixing portions, the lower shell body and the fixing portions need to be positioned with respect to each other and then welded together while maintaining that positional relationship. Thus, it is difficult to position with high accuracy or to weld them together with the positional relationship maintained. Besides, in welding the fixing portions, it might be difficult, or at least take some time, to see if the welding process has been done properly. Thus, sufficient reliability cannot be guaranteed in this welding process. Furthermore, due to the heat generated by the welding process, the aluminum alloy of the lower shell body or the fixing portions may have a degraded property, have a decreased strength, or be deformed. Additionally, it takes a rather long time to perform the welding process. None of these problems is caused by the lower shell of this preferred embodiment of the present invention.

As described above, the upper shell 202 is preferably formed by a press forming process and the lower shell 204 is preferably formed by a casting process. For that reason, at least the lower shell 204 is preferably made of an aluminum alloy containing silicon and the silicon content by weight percentage of the lower shell 204 is preferably greater than that of the upper shell 202. Then, it is possible to make the upper shell 202 with a beautiful shape and a smooth surface without causing any cracks. In addition, the lower shell 204 can also be formed highly accurately by making the melted alloy flow smoothly. Thus, by defining the contents of silicon in the materials of the upper and lower shells 202 and 204 in this manner, these materials can satisfy their required mechanical properties.

In a motorcycle including a fuel tank according to a preferred embodiment of the present invention, the fuel tank is made of either aluminum or an aluminum alloy. Accordingly, the motorcycle can have a reduced weight, a reduced fuel consumption, and improved running performance. In addition, since the upper shell thereof has a highly smooth surface, the motorcycle can have improved appearance by painting the fuel tank, for example.

It should be noted that the profile of the fuel tank, the shape of the fuel storage space defined by the fuel tank, and the shapes of the upper and lower shells that define the space as described for the preferred embodiments of the present invention are just examples and can be modified as desired. Thus, the fuel tank may have any shape other than those illustrated in the accompanying drawings. Also, the first and second sets of fixing portions may be arranged at positions that are not illustrated in the drawings. Furthermore, the first or second set of fixing portions does not have to include two fixing portions but may include three or more fixing portions. Optionally, only the first set of fixing portions may be provided. In a preferred embodiment described above, the lower shell body of the lower shell has two sets of side surfaces that extend in two opposite directions. However, the lower shell body may have only side surfaces extending in the same direction.

Also, in a preferred embodiment described above, when the fuel tank is fixed on the main frame and rear frame, the bonding portion between the upper and lower shells is preferably located in the lower half of the tank and near the bottom of the lower shell. Thus, if the lower part of the fuel tank is covered with a panel, for example, the bonding portion can be hidden behind the panel so as not to affect the appearance of the motorcycle. However, the bonding portion does not have to be located at that position but may be arranged at any other position on the fuel tank in view of the design of the motorcycle or the arrangement of its components.

In preferred embodiments described above, the upper shell is preferably made of either aluminum or an aluminum alloy. However, if the weight of the fuel tank can be reduced significantly just by making the lower shell of an aluminum alloy, then the upper shell may be made of a stainless steel or a structural steel, for example.

A motorcycle fuel tank according to any of the various preferred embodiments of the present invention described above can be used effectively in various motorcycles.

This application is based on Japanese Patent Application No. 2004-335596 filed on Nov. 19, 2004, the entire contents of which are hereby incorporated by reference.

While the present invention has been described with respect to preferred embodiments thereof, it will be apparent to those skilled in the art that the disclosed invention may be modified in numerous ways and may assume many preferred embodiments other than those specifically described above. Accordingly, it is intended by the appended claims to cover all modifications of the invention that fall within the true spirit and scope of the invention.

What is claimed is:

1. A motorcycle fuel tank comprising:
   an upper shell; and
   a lower shell including fixing portions, the lower shell being bonded to the upper shell and defining a fuel storage space with the upper shell, the fixing portions arranged to attach the lower shell onto a motorcycle body; wherein
   the lower shell is made of a first composition of one of a cast aluminum and a cast aluminum alloy such that the fixing portions are integral with the lower shell;
   the upper shell is made of a second composition of one of a press-formed aluminum and a press-formed aluminum alloy material; and
   the first composition is different from the second composition.

2. The fuel tank of claim 1, wherein the upper shell is made of one of Al, an Al—Mg based alloy, and an Al—Si—Mg based alloy and the lower shell is made of one of an Al—Si based alloy, an Al—Si—Mg based alloy, and an Al—Si—Cu based alloy.

3. The fuel tank of claim 1, further comprising a welded or brazed joint connecting the upper shell and the lower shell.

4. The fuel tank of claim 1, wherein the fixing portions include a first set of fixing portions arranged to be fixed on a first frame of the motorcycle body and a second set of fixing portions arranged to be fixed on a second frame of the motorcycle body.

5. The fuel tank of claim 4, wherein the lower shell includes a bottom and a side surface extending from a periphery of the bottom, the first set of fixing portions being arranged on the side surface.

6. The fuel tank of claim 5, wherein the first set of fixing portions includes two fixing portions and a rib portion arranged on the side surface to connect the two fixing portions of the first set together.

7. The fuel tank of claim 5, wherein the lower shell includes a fuel supply port having an opening through the bottom of the lower shell, and a flange arranged around the opening, wherein the fuel supply port and the lower shell are integral with each other.

8. The fuel tank of claim 5, wherein the second set of fixing portions includes two fixing portions respectively arranged on two opposing sides on the periphery of the bottom of the lower shell.

9. The fuel tank of claim 1, wherein the upper shell includes a plurality of upper sub-portions with welded or brazed joints connecting the sub-portions.

10. A motorcycle comprising:
a frame;
an engine supported on the frame; and
the fuel tank of claim 1, the fuel tank being fixed on the frame.

11. A motorcycle fuel tank comprising:
an upper shell; and
a lower shell including fixing portions, the lower shell being bonded to the upper shell and defining a fuel storage space with the upper shell, the fixing portions arranged to attach the lower shell onto a motorcycle body; wherein
the upper and lower shells are made of aluminum or an aluminum alloy and have mutually different compositions; and
at least the lower shell is made of an aluminum alloy containing silicon and a weight percentage of silicon in the lower shell is greater than a weight percentage of silicon in the upper shell.

12. The fuel tank of claim 11, wherein the upper shell is made of one of Al, an Al—Mg based alloy, and an Al—Si—Mg based alloy and the lower shell is made of one of an Al—Si based alloy, an Al—Si—Mg based alloy, and an Al—Si—Cu based alloy.

13. The fuel tank of claims 11, further comprising a welded or brazed joint connecting the upper shell and the lower shell.

14. The fuel tank of claim 11, wherein the fixing portions include a first set of fixing portions arranged to be fixed on a first frame of the motorcycle body and a second set of fixing portions arranged to be fixed on a second frame of the motorcycle body.

15. The fuel tank of claim 14, wherein the lower shell includes a bottom and a side surface extending from a periphery of the bottom, the first set of fixing portions being arranged on the side surface.

16. The fuel tank of claim 15, wherein the first set of fixing portions includes two fixing portions and a rib portion arranged on the side surface to connect the two fixing portions of the first set together.

17. The fuel tank of claim 15, wherein the lower shell includes a fuel supply port having an opening through the bottom of the lower shell, and a flange arranged around the opening, wherein the fuel supply port and the lower shell are integral with each other by casting.

18. The fuel tank of claim 15, wherein the second set of fixing portions includes two fixing portions respectively arranged on two opposing sides on the periphery of the bottom of the lower shell.

19. The fuel tank of claim 11, wherein the upper shell includes a plurality of upper sub-portions with welded or brazed joints connecting the sub-portions.

20. A motorcycle comprising:
a frame;
an engine supported on the frame; and
the fuel tank of claim 11, the fuel tank being fixed on the frame.

* * * * *